United States Patent Office 3,560,515
Patented Feb. 2, 1971

3,560,515
NEW THIAZOLOBENZODIAZEPINE COMPOUNDS AND METHODS FOR THEIR PRODUCTION
Edward F. Elslager and Donald F. Worth, Ann Arbor, Mich., assignors to Parke, Davis & Company, Detroit, Mich., a corporation of Michigan
No Drawing. Filed Aug. 5, 1968, Ser. No. 750,012
Int. Cl. C07d 99/06
U.S. Cl. 260—306.7          7 Claims

ABSTRACT OF THE DISCLOSURE 5,10-dihydro - 3 - (aryl)thiazolo[3,2-b][2,4]benzodiazepines, in which the 3-aryl group is phenyl, hydroxyphenyl, dihydroxyphenyl, (lower alkoxy)phenyl, di(lower alkoxy) phenyl, tolyl, xylyl, 2-thienyl, or 2-furyl; acid-addition salts thereof; and their production by reacting 1,2,4,5-tetrahydro-3H-benzo[2,4]diazepine-3-thione with an appropriately substituted halomethyl aryl ketone. The compounds of the invention are useful as inhibitors of blood platelet aggregation.

SUMMARY AND DETAILED DESCRIPTION

The present invention relates to new thiazolobenzodiazepine compounds that are useful as pharmacological agents and to methods for their production. More particularly, the invention relates to new 5,10-dihydro-3-(aryl) thiazolo[3,2-b][2,4]benzodiazepine compounds having in free base form the formula

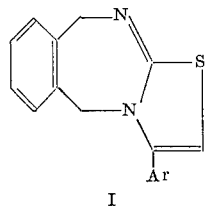

I and to pharmaceutically-acceptable salts thereof; where Ar is phenyl, hydroxyphenyl, dihydroxyphenyl, (lower alkoxy)phenyl, di(lower alkoxy)phenyl, tolyl, xylyl, 2-thienyl, or 2-furyl.

In accordance with the invention, thiazolobenzodiazepine compounds having the foregoing formula and salts thereof are produced by reacting 1,2,4,5-tetrahydro-3H-benzo[2,4]diazepine-3-thione, which is represented by the formula

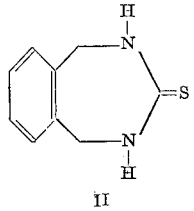

II with a halomethyl aryl ketone compound having the formula

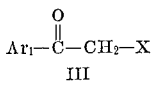

III where X is chlorine or bromine and Ar₁ is phenyl, hydroxyphenyl, dihydroxyphenyl, acyloxyphenyl, diacyloxyphenyl, (lower alkoxy)phenyl, di(lower alkoxy)phenyl, tolyl, xylyl, 2-thienyl, or 2-furyl. The reaction is advantageously carried out in an unreactive solvent medium. Suitable solvents include aromatic hydrocarbons, such as benzene, toluene, and xylene; tertiary amides, such as N,N-dimethylformamide, N,N - dimethylacetamide, and N - methyl-2-pyrrolidinone; and ethers, such as 2-methoxyethanol, dimethoxyethane, and diethylene glycol dimethyl ether; as well as mixtures of these. A preferred solvent is 2-methoxyethanol. The reaction is best carried out at an elevated temperature, which may range from 75 to 200° C. A preferred temperature is one between 100 and 130° C. At the preferred temperature, the reaction is normally complete after about 1–5 hours, although shorter or longer reaction periods may also be used, ranging from 15 minutes to 24 hours. It is preferable to employ equivalent amounts of 1,2,4,5-tetrahydro-3H-benzo[2,4]diazepine-3-thione and the halomethyl aryl ketone, although a slight to moderate excess of either is not harmful.

The product of the reaction is initially obtained in hydrochloride or hydrobromide salt form, depending upon whether a chloromethyl or a bromomethyl aryl ketone is used as one of the reactants. The product may be isolated directly in this salt form or it may be converted to the free base form by appropriate adjustment of the pH of the reaction mixture.

When Ar₁ in Formula III above is acyloxyphenyl or diacyloxyphenyl, the nature of the acyl group is not critical, because during the course of the reaction in the preferred 2-methoxyethanol solvent, the acyl group is removed to give a thiazolobenzodiazepine product of Formula I in which Ar is hydroxyphenyl or dihydroxyphenyl. Thus, the acyl group may be alkanoyl, such as acetyl, or it may be aroyl, such as benzoyl, and it may be substituted one or more times with a substituent that will not interfere with the reaction, such as lower alkyl, halogen, and nitro.

1,2,4,5-tetrahydro - 3H - benzo[2,4]diazepine-3-thione, which is used as one of the starting materials in the foregoing process, is prepared by first reacting o-xylene-α,α'-diamine with carbon disulfide and then heating the [o-(aminomethyl)benzyl]dithiocarbamic acid intermediate product at an elevated temperature (110–130° C.) in a suitable solvent medium, such as 2-methoxyethanol, whereby hydrogen sulfide is evolved and intramolecular cyclization occurs to give the desired 1,2,4,5-tetrahydro-3H-benzo[2,4]diazepine-3-thione.

The halomethyl aryl ketone starting materials having Formula III above are, as a class, known to the art. Previously unreported members of the class can be prepared by bromination or chlorination of the appropriate methyl aryl ketone, as illustrated in greater detail hereinafter.

The free base thiazolobenzodiazepine compounds of the invention having Formula I above form acid-addition salts with any of a variety of inorganic and organic acids. Pharmaceutically-acceptable acid-addition salts can be obtained directly from the reaction described above or by reacting one of the free base compounds with an acid such as hydrochloric, hydrobromic, hydriodic, nitric, sulfuric, phosphoric, acetic, citric, maleic, succinic, and pamoic acids. The free bases and salt forms are interconvertible by adjustment of the pH. They differ in certain physical properties, such as solubility in polar solvents, but, in general, are otherwise equivalent for the purposes of the invention.

The compounds of the invention, in free base and acid-addition salt form, are new chemical compounds useful as pharmacological agents that are active in inhibiting blood platelet aggregation. Their activity in this regard can be demonstrated and quantitatively measured in a standard in vitro test as follows. Platelet rich plasma is prepared by centrifuging rabbit blood that has been mixed with one-tenth its volume of 3.8% aqueous sodium citrate. The platelet rich plasma is then added to an aqueous tris-(hydroxymethyl)aminomethane buffer solution (pH 7.2) in Klett tubes, to which has been added either calcium (1.0 μmoles/ml.) alone, in the case of control tubes, or calcium (1.0 μmoles/ml.) and one of the test compounds at varying molar concentrations. A reading of the optical density is immediately taken for each of the tubes. To each tube is then added adenosine diphosphate (1.0μg./ml.), which is known to cause aggregation of blood platelets and hence a consequent decrease in optical density, and the tubes are shaken mechanically on a rotating table for eight minutes, when an optical density reading is again taken for each tube.

The readings for the control tubes are compared with those for the tubes containing the test compound, and the inhibition of aggregation caused by the test compound is calculated as the percentage difference between the decrease in optical density in the two sets of tubes. Thus, if the decrease in optical density in the test compound tubes is 20% of the decrease in the control tubes, the test compound is considered to cause an 80% inhibition of aggregation.

The results obtained in the foregoing test procedure for some representative compounds of the present invention are summarized in the following table.

| Compound | Molar concentration | Inhibition of platelet aggregation, percent |
| --- | --- | --- |
| 5,10-dihydro-3-phenylthiazolo[3,2-b][2,4]benzodiazepine [1] | $10^{-5}$ | [2] 79, 57 |
| o-(5,10-dihydrothiazolo[3,2-b][2,4]benzodiazepin-3-yl)phenol [1] | $5 \times 10^{-5}$ | 73 |
| 5,10-dihydro-3-(o-methoxyphenyl)thiazolo[3,2-b][2,4]benzodiazepine.[1] | $5 \times 10^{-5}$ | [2] 100, 80, 73 |
| 5,10-dihydro-3-(2,4-xylyl)thiazolo[3,2-b][2,4]benzodiazepine [3] | $<5 \times 10^{-4}$ | 85 |
| 3-(2-furyl)-5,10-dihydrothiazolo[3,2-b][2,4]benzodiazepine [1] | $5 \times 10^{-5}$ | 62 |
| 5,10-dihydro-3-(2-thienyl)thiazolo[3,2-b][2,4]benzodiazepine [1] | $<5 \times 10^{-4}$ | 68 |

[1] Tested as the hydrobromide salt.
[2] Separate values obtained in separate, individual experiments.
[3] Tested as the hydrochloride salt.

The preferred compounds of the invention, by virtue of their high degree of activity in inhibiting blood platelet aggregation, are 5,10-dihydro-3-(o-methoxyphenyl)thiazolo[3,2-b][2,4]benzodiazepine and pharmaceutically-acceptable salts thereof.

The invention is illustrated by the following examples.

EXAMPLE 1

A solution of 12.4 g. of α-bromoacetophenone in 100 ml. of 2-methoxyethanol is added in portions over a period of five minutes to a solution of 10.0 g. of 1,2,4,5-tetrahydro-3H-benzo[2,4]diazepine - 3 - thione in 1000 ml. of boiling 2-methoxyethanol, and the resulting mixture is heated under reflux for 2.5 hours. The reaction mixture is then evaporated under reduced pressure to give a solid residue of 5,10-dihydro-3-phenylthiazolo[3,2-b][2,4]benzodiazepine monohydrobromide, which is isolated, washed with ethanol, and dried; M.P. 256–257° C.

The above product is obtained in free base form by the following procedure. The hydrobromide salt is dissolved in aqueous ethanol, and the resulting solution is made basic with aqueous sodium hydroxide. The basic mixture is then diluted with an equal volume of water, and the free base 5,10-dihydro - 3 - phenylthiazolo[3,2-b][2,4]-benzodiazepine that precipitates is isolated and dried.

5,10 - dihydro - 3 - phenylthiazolo[3,2-b][2,4]benzodiazepine monocitrate is obtained by adding a solution of 2.78 g. of the free base in methanol to a solution of 1.92 g. of citric acid in methanol and evaporating the resulting mixture to dryness under reduced pressure.

5,10 - dihydro - 3 - phenylthiazolo[3,2-b][2,4]benzodiazepine monoacetate is obtained by treating a solution of 5.56 g. of the free base in methanol with 1.2 g. of glacial acetic acid and evaporating the resulting mixture to dryness under reduced pressure.

The 1,2,4,5 - tetrahydro - 3H - benzo[2,4]diazepine-3-thione starting material is obtained as follows. A solution of 154 g. of o-xylene-α,α'-diamine in 800 ml. of ethanol is added to a stirred solution of 136 ml. of carbon disulfide in 150 ml. of ethanol while the temperature is maintained below 30° C. The resulting mixture is stirred at room temperature for 2.5 hours and then filtered to isolate the solid precipitate of [o-(aminomethyl)benzyl]-dithiocarbamic acid; M.P. >300° C. This intermediate product (180 g.) is added to 500 ml. of 2-methoxyethanol, and the resulting mixture is heated under reflux for one hour or until no more hydrogen sulfide is evolved. The reaction mixture is then cooled, and the solid 1,2,4,5-tetrahydro - 3H - benzo[2,4]diazepine - 3 - thione that precipitates is isolated and dried; M.P. 290° C. (with decomposition).

EXAMPLE 2

Utilizing the procedure described in Example 1 above the following thiazolobenzodiazepine compounds are obtained from the reaction of the indicated amount of 1,2,4,5-tetrahydro - 3H - benzo[2,4]diazepine-3-thione (referred to below as "thione") and the designated halomethyl aryl ketone:

(a) o-(5,10 - dihydrothiazolo[3,2-b][2,4]benzodiazepin - 3 - yl)phenol monohydrobromide, M.P. 273° C. following crystallization from acetonitrile; from 3.7 g. of thione and 4.8 g. of α-bromo-o-hydroxyacetophenone benzoate ester in 450 ml. of 2-methoxyethanol.

(b) 4-(5,10 - dihydrothiazolo[3,2-b][2,4]benzodiazepin - 3 - yl)pyrocatechol monohydrochloride, M.P. 258–259° C. (2-methoxyethanol); from 3.7 g. of thione and 3.8 g. of α-chloro 3,4-dihydroxyacetophenone in 150 ml. of 2-methoxyethanol.

(c) 5,10 - dihydro - 3 - (o-methoxyphenyl)thiazolo[3,2-b][2,4]benzodiazepine monohydrobromide, M.P. 243° C. (benzene); from 5.0 g. of thione and 7.2 g. of α-bromo-o-methoxyacetophenone in 600 ml. of 2-methoxyethanol.

(d) 5,10 - dihydro - 3 - (m-methoxyphenyl)thiazolo[3,2-b][2,4]benzodiazepine monohydrobromide, M.P. 252–254° C. (water); from 3.0 g. of thione and 3.7 g. of α-bromo-m-methoxyacetophenone in 300 ml. of 2-methoxyethanol.

(e) 5,10 - dihydro - 3 - (p-methoxyphenyl)thiazolo[3,2-b][2,4]benzodiazepine monohydrobromide, M.P. 244° C. (water); from 3.0 g. of thione and 3.7 g. of α-bromo-p-methoxyacetophenone in 300 ml. of 2-methoxyethanol.

(f) 3 - (2,5 - dimethoxyphenyl) - 5,10-dihydrothiazolo[3,2-b][2,4]benzodiazepine monohydrobromide, M.P. 248° C. (water); from 3.0 g. of thione and 4.2 g. of α-bromo-2,5-dihydroxyacetophenone in 300 ml. of 2-methoxyethanol.

(g) 5,10-dihydro - 3 - (2,4-xylyl)thiozolo[3,2-b][2,4]benzodiazepine monohydrochloride, M.P. 259–260° C. (2-propanol); from 2.9 g. of thione and 3.0 g. of α-chloro-2,4-dimethylacetophenone in 200 ml. of 2-methoxyethanol.

(h) 3 - (2 - furyl) - 5,10 - dihydrothiazolo[3,2-b][2,4]benzodiazepine monohydrobromide, M.P. 207–209° C. (methanolethyl acetate); from 3.6 g. of thione and 3.8 g. of bromomethyl 2-furyl ketone in 150 ml. of 2-methoxyethanol.

(i) 5,10-dihydro - 3 - (2 - thienyl)thiazolo[3,2-b][2,4]benzodiazepine monohydrobromide, M.P. 232–233° C.

(ethanolether); from 3.6 g. of thione and 4.1 g. of bromomethyl 2-thienyl ketone in 100 ml. of 2-methoxyethanol.

EXAMPLE 3

Utilizing the procedure of Example 1 above, the following thiazolobenzodiazepine compounds are obtained from the reaction of equimolar amounts of 1,2,4,5-tetrahydro-3H-benzo[2,4]diazepine-3-thione and the halomethyl aryl ketone designated below in 2-methoxyethanol:

(a) 3 - (p - ethoxyphenyl) - 5,10 - dihydrothiazolo[3,2-b][2,4]benzodiazepine monohydrochloride; from α-chloro-p-ethoxyacetophenone.

(b) 3 - (2,5 - diethoxyphenyl) - 5,10-dihydrothiazolo[3,2-b][2,4]benzodiazepine monohydrobromide; from α-bromo-2,5-diethoxyacetophenone.

(c) 5,10 - dihydro - 3 - (m-tolyl)thiozolo[3,2-b][2,4]benzodiazepine monohydrochloride; from α-chloro-m-methylacetophenone.

(d) 5,10 - dihydro - 3 - (o-tolyl)thiazolo[3,2-b][2,4]benzodiazepine monohydrobromide; from α-bromo-o-methylacetophenone.

The preparation of the various halomethyl aryl ketone starting materials that are required for the production of the compounds of this and preceding examples can be illustrated by the preparation of α-bromo-o-methoxyacetophenone and α-chloro-m-methoxyacetophenone, respectively, as follows:

(1) α-Bromo-o-methoxyacetophenone.—To a stirred solution of 50 g. of o-methoxyacetophenone in 500 ml. of ether is added dropwise over a period of ten minutes 53 g. of bromine while the temperature is maintained below 30° C. The resulting mixture is stirred at room temperature for 30 minutes and is then evaporated to dryness to give a solid residue of α-bromo-o-methoxyacetophenone, M.P. 40–44° C. following crystallization from cyclohexane.

(2) α-Chloro-m-methylacetophenone.—A solution of 13.5 g. of sulfuryl chloride in 100 ml. of dry ether is added dropwise to a stirred solution of 13.4 g. of m-methylacetophenone in 150 ml. of dry ether while the temperature is maintained below 30° C. The resulting solution is stirred at room temperature for one hour and is then evaporated to dryness to give a residue of α-chloro-m-methylacetophenone, suitable for use without further purification.

We claim:

1. A member of the class consisting of 5,10-dihydro-3 - (aryl)thiazolo[3,2-b][2,4]benzodiazepine compounds having in free base form the formula

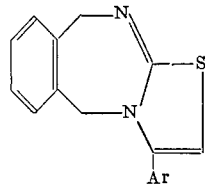

and pharmaceutically-acceptable salts thereof; where Ar is a member of the class consisting of phenyl, hydroxyphenyl, dihydroxyphenyl, (lower alkoxy)phenyl, di(lower alkoxy)phenyl, tolyl, xylyl, 2-thienyl, and 2-furyl.

2. Pharmaceutically-acceptable acid-addition salts of 5,10-dihydro - 3 - (aryl)thiazolo[3,2-b][2,4]benzodiazepine compounds as defined in claim 1.

3. A compound according to claim 2 which is 5,10-dihydro - 3 - (o-methoxyphenyl)thiazolo[3,2-b][2,4]benzodiazepine monohydrobromide.

4. A compound according to claim 2 which is 5,10-dihydro - 3 - phenylthiazolo[3,2-b][2,4]benzodiazepine monohydrobromide.

5. A compound according to claim 2 which is o-(5,10-dihydrothiazolo[3,2-b][2,4]benzodiazepin - 3 - yl)phenol monohydrobromide.

6. A compound according to claim 2 which is 5,10-dihydro - 3 - (m - methoxyphenyl)thiazolo[3,2-b][2,4]benzodiazepine monohydrobromide.

7. A compound according to claim 2 which is 3-(2-furyl) - 5,10 - dihydrothiazolo[3,2-b][2,4]benzodiazepine monohydrobromide.

References Cited

UNITED STATES PATENTS

| | | | |
|---|---|---|---|
| 3,147,273 | 9/1964 | Szmuszkovicz | 260—306.7 |
| 3,225,045 | 12/1965 | Walker | 260—306.7 |

ALEX MAZEL, Primary Examiner

R. J. GALLAGHER, Assistant Examiner

U.S. Cl. X.R.

260—239, 592; 424—200, 272